PROCESS FOR MAKING SHOE HAVING CROSS-LINKED RAND INSOLE

Original Filed Sept. 19, 1963 2 Sheets-Sheet 1

INVENTORS
CHARLES F. BATCHELDER
JEROME A. RUBICO
BY
Russell, Chittick & Pfund
ATTORNEYS

PROCESS FOR MAKING SHOE HAVING CROSS-LINKED RAND INSOLE

Original Filed Sept. 19, 1963 2 Sheets-Sheet 2

INVENTORS
CHARLES F. BATCHELDER
JEROME A. RUBICO
BY
Russell, Chittick & Pfund
ATTORNEYS United States Patent Office Re. 27,009
Reissued Dec. 22, 1970

27,009
PROCESS FOR MAKING SHOE HAVING CROSS-LINKED RAND INSOLE

Charles F. Batchelder, Milton, and Jerome A. Rubico, Boston, Mass., assignors to Batchelder-Rubico, Inc., Boston, Mass., a corporation of Massachusetts Original No. 3,345,663, dated Oct. 10, 1967, Ser. No. 310,029, Sept. 19, 1963. Application for reissue Oct. 9, 1969, Ser. No. 868,250
Int. Cl. A43d *9/00*
U.S. Cl. 12—142 20 Claims

Matter enclosed in heavy brackets [ ] appears in the original patent but forms no part of this reissue specification; matter printed in italics indicates the additions made by reissue.

*ABSTRACT OF THE DISCLOSURE*

*A process for making a shoe which utilizies a cross-linked rand insole having a peripheral rand portion and a central core portion including the forepart and a major portion of the area between the ball tread line and the beginning of the narrow neck portion of the shank. The rand and central core portion are held together by frangible ties or links. After lasting, the central core portion is removed and the shoe is finished.*

This invention relates to shoe and shoemaking, and more particularly to a novel cross-linked rand insole, a process for using it and an unusually light and flexible shoe employing the same.

In our prior and copending application, Ser. No. 278,-568, filed May 7, 1963, we described a novel skeletal rand insole shoe construction. The present invention constitutes a specific improvement thereover.

The objects and features of this invention will best be understood and appreciated from more detailed descriptions of preferred embodiments thereof, selected for purposes of illustration, and shown in the accompanying drawings in which.

Figure 1:
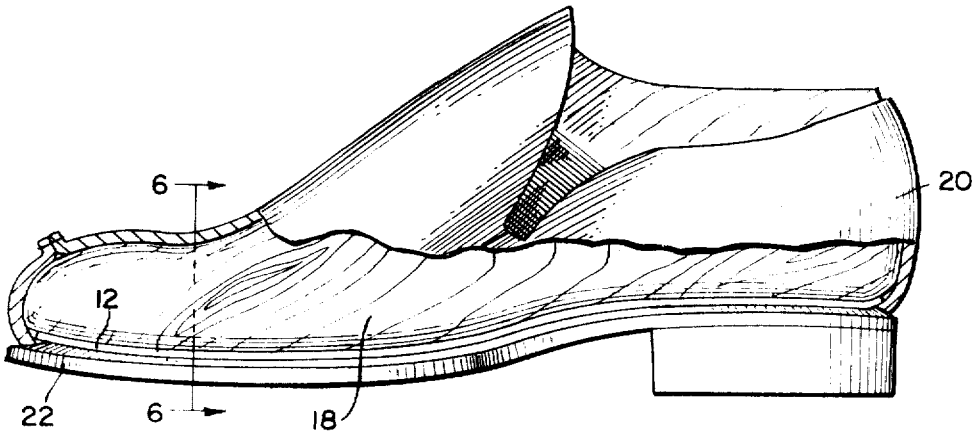
FIG. 1 is a view in side elevation of a lasted shoe manufactured in accordance with our invention with a portion of the upper cut away to expose the internal construction of the shoe.
Figure 2:
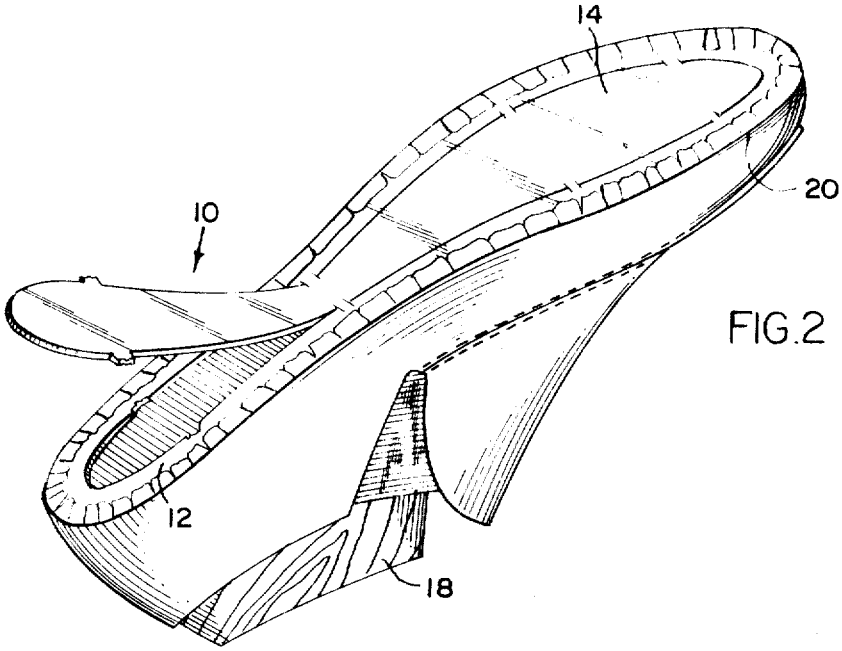
FIG. 2 is a view in perspective of the shoe of our invention following the lasting operation but prior to sole laying.
Figure 3:
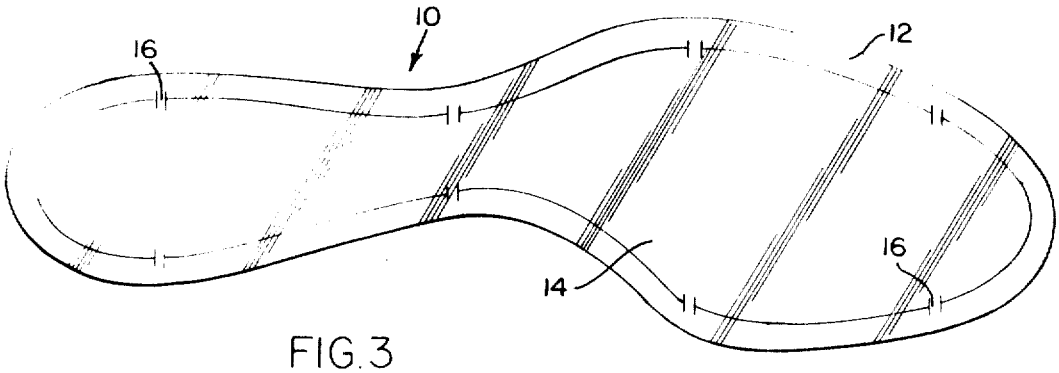
FIG. 3 is a plan view of the cross-linked rand insole blank of our invention.
Figure 4:
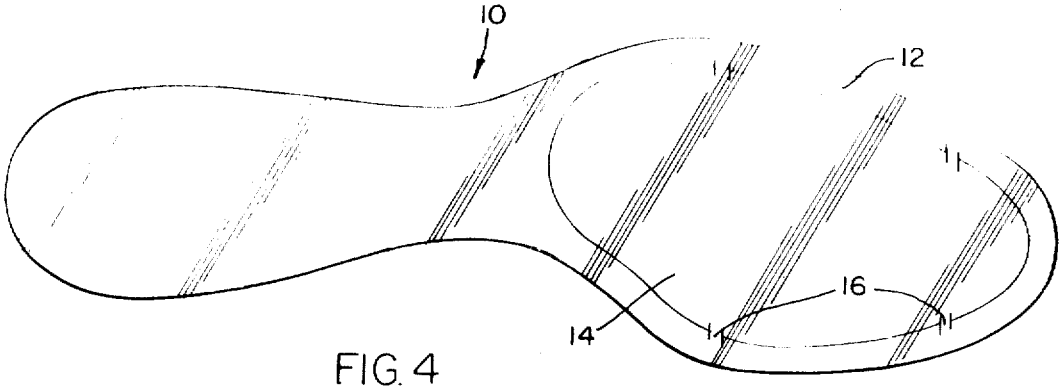
FIG. 4 is a plan view of a form of the cross-linked rand insole of our invention emp loyed in the manufacture of women's high heeled shoes.
Figure 6:
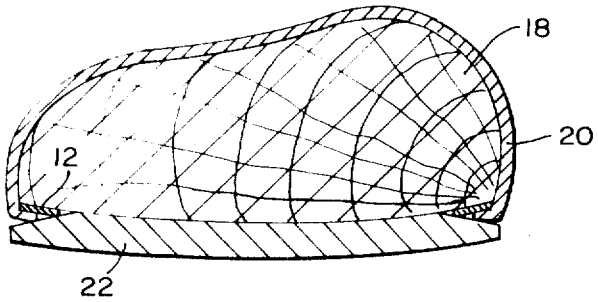
FIG. 6 is a cross sectional view in end elevation along the lines 6—6 of FIG. 1.

The primary element of our invention herein described is a cross-linked rand insole indicated generally at 10 in FIGS. 2, 3 and 4. By the term "cross-linked rand insole," we mean an insole which has been cut out in the conventional shape and additionally cut or slit inwardly of its periphery so as to separate the insole into two portions, one constituting a rand 12 extending substantially around at least the forward portion of the shoe, and a central or core portion 14 extending across the entire area within the rand 12. The rand 12, however, is not entirely severed from the core portion 14, but is maintained cross-linked thereto by small ties or links 16 spaced around the insole.

The material employed in the production of the cross-linked rand insole 10 may be extremely thin, down to 1 iron (1/48"), and may be fabricated from synthetic materials such as Texon, manufactured by Texon, Inc., Russell, Mass., or Jenkins board, manufactured by George O. Jenkins Company of Bridgewater, Mass. In addition, Gem duck, leather, and the like materials may also be suitable.

The cross-linked rand insole 10 may be formed by cutting the base stock material in a suitable insole cutting machine or "clicker," the severance of the rand 12 from the core 14 being accomplished by a double die arrangement in which the outer periphery of the cross-linked rand insole 10 and the inner perforations are all cut with a single stroke of the clicker arm.

After the cross-linked rand insole 10 has been cut from suitable insole stock, the steps of a preferred embodiment of the process are as follows:

Step 1.—The insole of 10 is applied to a last 18. Since the insole is relatively flexible as a result of the rand 12 being substantially severed from the core 14, it readily conforms to the compound curvatures of the last 18 without "fighting the last."

Step 2.—The cross-linked rand insole 10 is next temporarily secured to the last 18 by conventional means such as by tacks. It can also be secured by spot adhesive bonding or other suitable means. If tacks are used, the tacks are driven preferably through the insole core 14 thus leaving the outer rand 12 entirely free of tacks. Since the rand 12 and core 14 are joined together by the links 16, tacking the core 14 to the last is sufficient to firmly position the rand 12 on the last. The primary advantage of our invention, however, with respect to the tacks is realized only when the core 14 is subsequently removed from the completed shoe either prior to sole laying or thereafter. In both cases, the possibility of broken tacks accidentally remaining in the completed shoe is completely eliminated because the tacks will either remain in the last or be removed along with the insole core 14.

As an alternative to tacking the cross-linked rand insole 10 to the last 18, spot adhesive bonding can be employed to temporarily secure the cross-linked rand insole 10 to the last 18. The cement which is used for spot adhesive bonding must provide an adequate bond to hold the cross-linked rand insole 10 in place during the lasting process, yet be sufficiently weak to permit subsequent rupture of the cement bond. For this purpose, we employ a latex-based cement sold by the Cambridge Chemical Company under their designation No. 1366. When this particular type of cement is allowed to dry on the surface of the cross-linked rand insole 10 for approximately three minutes until the white color disappears, it can then be stuck to the last 18 sufficiently to hold the cross-linked rand insole 10 in place during the lasting, but without creating such a permanent bond that the core portion 14 cannot thereafter be removed from the last 18.

Figure 5:
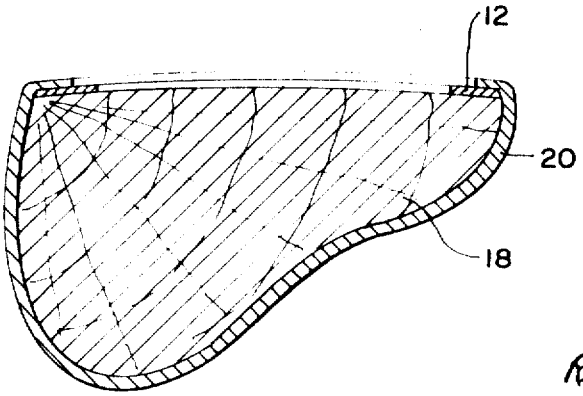
FIG. 5 is a cross sectional view in end elevation of the shoe after lasting but before sole laying.

Step 3.—With the cross-linked rand insole 10 thus temporarily secured to last 18, if the lasting cement has not already been "pre-cemented" to the rand 12, it may then be applied to the lasting margin of the rand 12 preparatory to cement lasting an upper 20. In some processes, however, lasting cement is applied simultaneously with the lasting operation. Since the entire central portion of the cross-linked rand insole 10 is solid and since the core 14 and the rand 12 are in virtually abutting relation, the lasting cement can be brushed, rolled or otherwise applied to the insole lasting margin without danger of accidentally spreading cement on the bottom of the last 18. The lasting margin of the upper 20 is then lasted to the cement-coated margin of the rand 12. FIG. 5 depicts in cross section the lasted upper 20 and the rand 12.

It will be noted that the forces applied to the rand 12 during lasting act on the links 16 almost entirely in tension and accordingly the materials of which the cross-linked rand insole 10 is made should be relatively strong in tension. In addition, it will be noted that the links 16 are spaced in diametrically opposed pairs across the insole 10, and appropriately located in the toe, ball, shank and heel areas of the shoe. As shown in FIG. 2, the size and spacing of the links 16 is approximately correct for Texon having a 2 iron thickness. Other materials, of course, may require different link dimensions and spacing. The guide to the selection of these variables is, of course, to have sufficient cross-linking to support and hold the shape of the rand 12 during lasting, while still permitting the core 14 to be sufficiently free from the rand to permit subsequent removal of the core 14.

Step 4.—After lasting the upper 20 to the rand 12, the lasting margin of the upper 20 is roughed in the conventional manner. During the roughing process, the abutting margins of the rand 12 and core 14 are reduced in thickness, which in turn also reduces the thickness of, and consequently the strength of, the links 16. This reduction of thickness and strength may be important if materials which are relatively strong in tear resistance are employed. Also, if the cross-linked rand insole has a thickness of 3 irons or more, it may be important to employ the roughing operation to impart a bevel to the inner periphery of the rand 12 for purposes of smoothness of the shoe bottom and comfort to the wearer. On the other hand, it should be noted that the construction of the cross-linked rand insole 10 of our invention, including a multiplicity of closely spaced links, permits the use of extremely thin material. This is an advantage as far as cost and weight are concerned, but also the thinness means that there is less need to bevel the inner edge of the rand 12.

Step 5.—After lasting and roughing as described in Steps 3 and 4, the tacks holding the cross-linked rand 10 to the last 18 are pulled out and, after applying the sole laying cement to the rand and lasting margin of the upper, the core portion 14 of the cross-linked rand 10 is then torn out as may be seen in process in FIG. 2. If the cross-linked rand insole 10 had been adhesively secured rather than tacked to the last 18, the tearing out operation shown in FIG. 2 would simply involve rupturing the adhesive bond between it and the last at that time. Normally Step 5 is carried out when the shoe is in condition such that the upper will not distort the unsupported rand 12. Thus if the core 14 is removed and the upper is allowed to dry on the last for a substantial period after the removal, but prior to sole laying, there is a possibility that the unsupported rand might pull away from its proper position on the last. We have found, however, that such distortion does not take place if the sole laying operation is carried out soon after removal of the core portion 14, or if the upper is allowed to dry and lose its temper prior to removal of the core portion.

Step 6.—After removal of the core portion 14, the shoe is in condition as shown in FIG. 5, and it is completed by cementing or otherwise attaching by conventional means one or more outsole elements 22 to the roughed lasting margin of the upper 20 and to so much of the inner peripheral margin of the rand 12 as is exposed. Since the sole laying adhesive was applied while the core portion 14 was still in place, there is no danger that sole laying adhesive would have spilled over onto the last, and for this reason the application of cement can extend out to and completely cover the entire inner periphery of the rand. Thus an extremely complete and uniform bond between the outsole and the bonding margin of the upper 20 and rand 12 can be made following the procedures herein described.

The subsequent conventional steps of pulling the last, inserting a sock lining, etc. are then carried out, but since they form no part of the invention, they will not be described in detail herein.

Turning now to the special features and advantages of our invention, it will be seen that the cross-linked rand insole construction presents important economies in labor and material. From the manufacturing viewpoint, the process is highly attractive because (a) it eliminates the need for distinguishing between right and left insole elements, (b) one die only for each insole size is needed, (c) the danger of broken or unpulled tacks remaining in the shoe is eliminated, (d) the operator need not take care with respect to the area of application of lasting or sole laying cement, and (e) the need for last bottom cleaning is eliminated. As for the shoe itself, since the sole laying adhesive can be applied to the entire inner bonding margin of the upper and rand, an extremely uniform and extensive outsole bond can be achieved.

Particularly with respect to the shoe itself, it will be noted that our invention permits the construction of an extremely flexible shoe in which the heel of the shoe virtually seems to follow or hug the heel of the wearer. Thus the novel construction of this shoe is ideally suited for shoes of the type known as "loafers" as well as producing a remarkably comfortable dress shoe. Moreover, it will be noted that the extremely uniform and complete adhesive bond permitted by the fact that the adhesive can be applied prior to the removal of the core portion 14 without danger of inadvertent application of adhesive to the bottom of the last while completely covering the vital peripheral margin of the rand and lasting margin of the upper, insures the production of a strong and permanent adhesive bond for the outsole.

Figure 7:
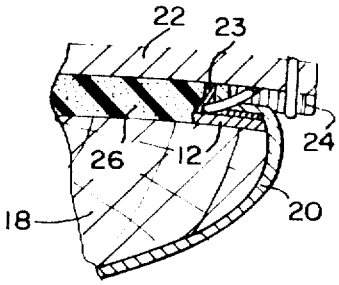
FIG. 7 is a fragmentary cross sectional view showing our invention adapted for a Goodyear shoe.

Having thus disclosed and described a preferred embodiment of our invention, it will now be apparent to those skilled in the art that variations in the specific form herein described can be made without departing from the spirit of the invention. Thus certain materials may be employed having sufficient tensile strength to withstand lasting tensions and which are otherwise so weak in tear resistance that the size and spacing of the links 16 shown in FIG. 2 may be substantially varied. In addition, it will be seen that a Goodyear welt shoe can be made by the process herein described (see FIG. 7). This is done by attaching an insole rib 23 to the cross-linked rand insole 10 in the area of the rand portion 12, then lasting the upper 20 to the insole rib 23, and then attaching a welt 24 to the insole rib 23 prior to tearing out the core portion 14. Certain of the advantages of the shoe and process of our invention are not enjoyed by such a Goodyear welt shoe, but, on the other hand, with Goodyear welt shoes the process clearly benefits from the safety feature of our invention in that no broken or unpulled tacks can remain in the shoe. Also, it permits the insertion of a relatively thick pad 26 in the area of the shoe otherwise occupied by bottom fill material. The possibility of increased comfort from such a pad is an important consideration. Also such a shoe is substantially more flexible than the usual Goodyear welt shoe because it avoids the resistance to shoe flexing normally imparted by the insole. It will be understood also that the process of our invention is adaptable similarly to other conventional shoemaking processes.

Also it will be noted that the core portion 14 can effectively be permitted to remain in the shoe during sole laying and be removed thereafter either at the time the last is pulled from the shoe or by a separate step after last pulling.

Accordingly it is not our intention to confine the invention to the precise form herein shown, but rather to limit it in terms of the appended claims.

Having thus described and disclosed a preferred embodiment of our invention, what we claim as new and desire to secure by Letters Patent of the United States is:

1. A process for making shoes comprising the steps of: making a cross-linked rand insole having an exterior, peripheral rand portion, a central core portion including the forepart and at least substantially all of the shank area of said insole and frangible means for temporarily interconnecting the said rand and core portions; applying said insole to a last; lasting an upper to said rand portion; removing said central core portion; and attaching a sole element to the lasting margin of said upper.

2. The process defined in claim 1 further characterized by removing said core portion prior to attaching said sole element.

3. The process defined in claim 1 further characterized by removing said core portion after attaching said sole element.

4. A process for making shoes comprising the steps of: making a cross-link rand insole having an exterior, peripheral rand portion, a central core portion including the forepart and at least substantially all of the shank area of said insole and frangible means integral with said rand and core portions for temporarily interconnecting the said rand and core portions; applying said insole to a last; lasting an upper to said rand portion; applying sole laying adhesive to the lasting margin of said upper and exposed portion of said rand portion with said core portion in substantially abutting relation to said rand portion; removing said central core portion; and adhesively securing a sole element to said lasting margin.

5. The process defined in claim 4 further characterized by removing said core portion prior to attaching said sole element.

6. The process defined in claim 4 further characterized by removing said core portion after attaching said sole element.

7. A process for making Goodyear welt shoes comprising the steps of: making a cross-linked rand insole having an exterior, peripheral rand portion, an insole rib on said rand portion, a central core portion including the forepart and at least substantially all of the shank area of said insole, and means for temporarily interconnecting the said rand and core portions; applying said cross-linked rand insole to a last; lasting an upper to said rib, attaching a welt to said rib, and attaching an outsole to said welt, said core portion being removed in the finished shoe.

8. A process for making Goodyear welt shoes as defined in claim 7 further characterized by removing said core portion prior to attaching said outsole to said welt.

9. A process for making Goodyear welt shoes as defined in claim 7 further characterized by removing said core portion after attaching said sole element.

10. A process for making Goodyear welt shoes as defined in claim 7 further characterized by inserting a pad in the place of said core portion.

*11. A process for making shoes comprising the steps of: making a cross-linked rand insole having an exterior, peripheral rand portion, a central core portion including the forepart and a major portion of the area between the ball tread line and the beginning of the narrow neck portion of the shank of said insole and frangible means for temporarily interconnecting the said rand and core portions; applying said insole to the last; lasting an upper to said rand portion; removing said central core portion; and attaching a sole element to the lasting margin of said upper.*

*12. The process defined in claim 11 further characterized by removing said core portion prior to attaching said sole element.*

*13. The process defined in claim 11 further characterized by removing said core portion after attaching said sole element.*

*14. A process for making shoes comprising the steps of: making a cross-linked rand insole having an exterior, peripheral rand portion, a central core portion including the forepart and a major portion of the area between the ball tread line and the beginning of the narrow neck portion of the shank of said insole and frangible means integral with said rand and core portions for temporarily interconnecting the said rand and core portions; applying said insole to a last; lasting an upper to said rand portion; applying sole laying adhesive to the lasting margin of said upper and exposed portion of said rand portion with said core portion in substantially abutting relation to said rand portion; removing said central core portion; and adhesively securing a sole element to said lasting margin.*

*15. The process defined in claim 14 further characterized by removing said core portion prior to attaching said sole element.*

*16. The process defined in claim 14 further characterized by removing said core portion after attaching said sole element.*

*17. A process for making Goodyear welt shoes comprising the steps of: making a cross-linked rand insole having an exterior, peripheral rand portion, an insole rib on said rand portion, a central core portion including the forepart and a major portion of the area between the ball tread line and the beginning of the narrow neck portion of the shank of said insole, and means for temporarily interconnecting the said rand and core portions; applying said cross-linked rand insole to a last; lasting an upper to said rib, attaching a welt to said rib, and attaching an outsole to said welt, said core portion being removed in the finished shoe.*

*18. A process for making Goodyear welt shoes as defined in claim 17 further characterized by removing said core portion prior to attaching said outsole to said welt.*

*19. A process for making Goodyear welt shoes as defined in claim 17 further characterized by removing said core portion after attaching said sole element.*

*20. A process for making Goodyear welt shoes as defined in claim 17 further characterized by inserting a pad in the place of said core portion.*

References Cited

The following references, cited by the Examiner, are of record in the patented file of this patent or the original patent.

UNITED STATES PATENTS

| | | | |
|---|---|---|---|
| 2,090,410 | 8/1937 | Clifford | 36—43 |
| 2,145,713 | 1/1939 | Damon | 36—19.5 |
| 2,309,673 | 2/1943 | Schlear | 36—43 |
| 2,665,504 | 1/1954 | McConnell | 36—17 |
| 2,826,770 | 3/1958 | Freeman | 36—17X |
| 2,832,975 | 5/1958 | Pearsall et al. | 12—142 |
| 3,025,544 | 3/1962 | Fake et al. | 12—142 |
| 3,133,360 | 5/1964 | Taylor | 36—17 |

FOREIGN PATENTS

| | | | |
|---|---|---|---|
| 427,468 | 4/1935 | Great Britain | 12—142 |

PATRICK D. LAWSON, Primary Examiner